UNITED STATES PATENT OFFICE.

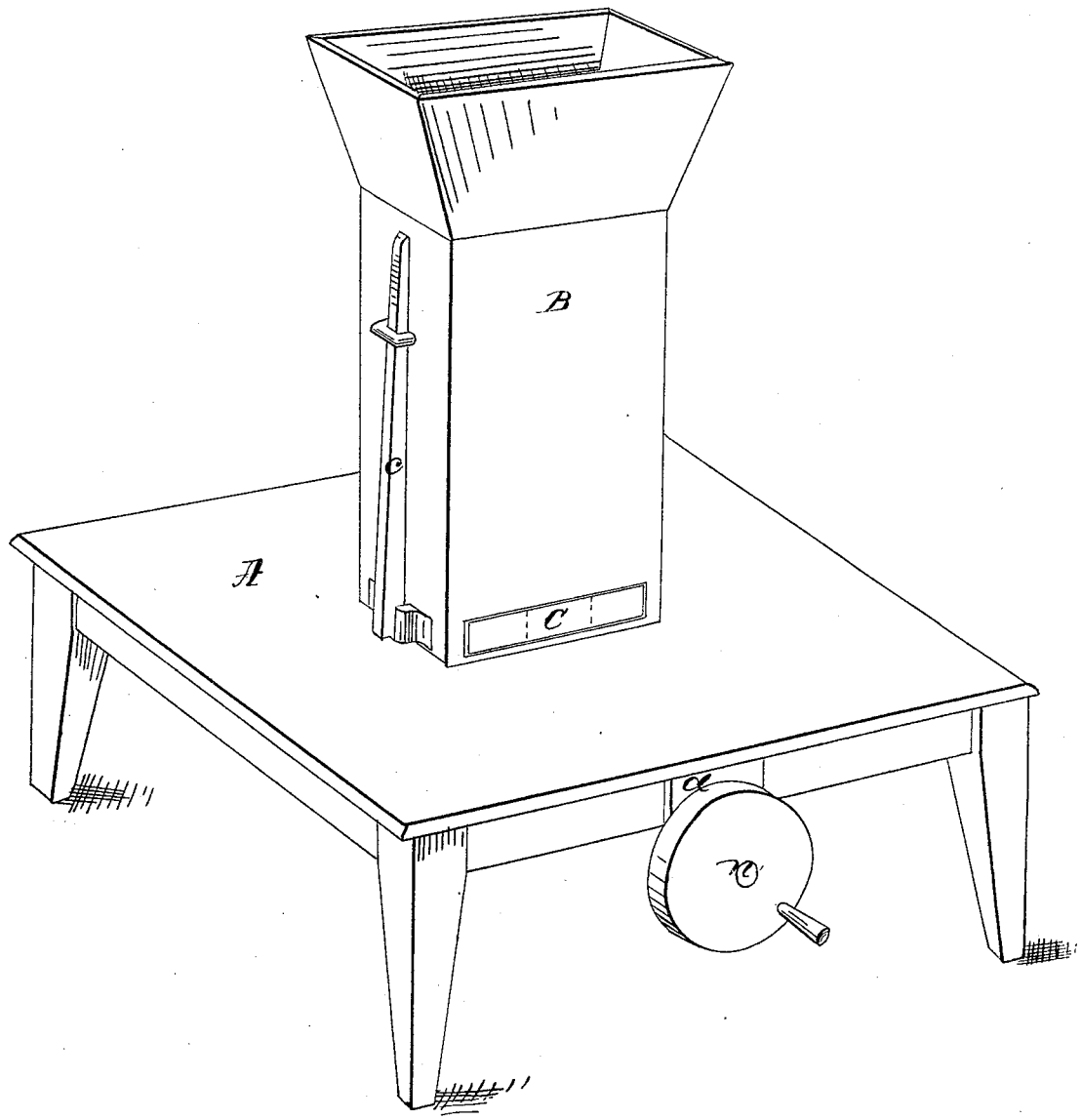

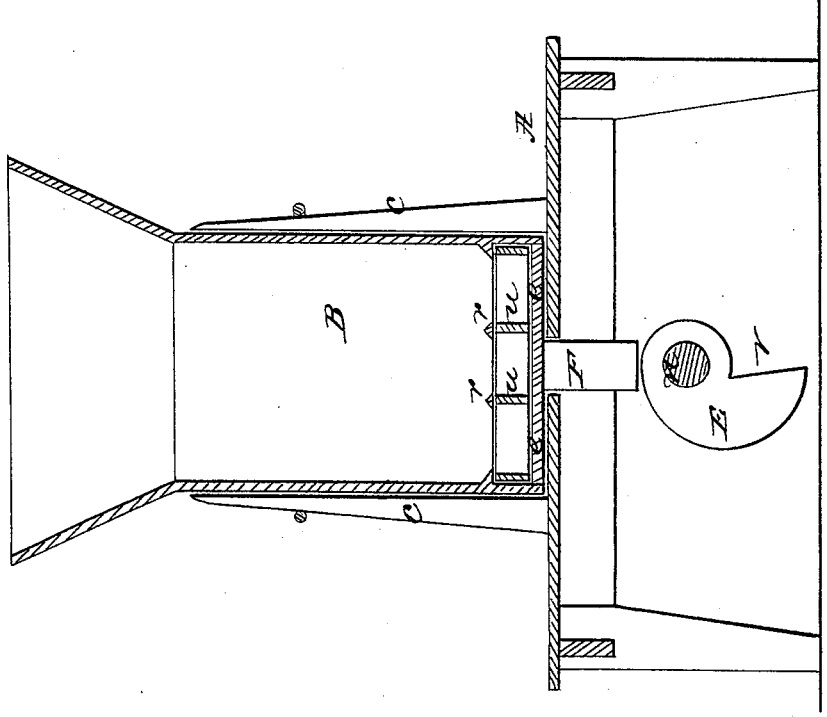
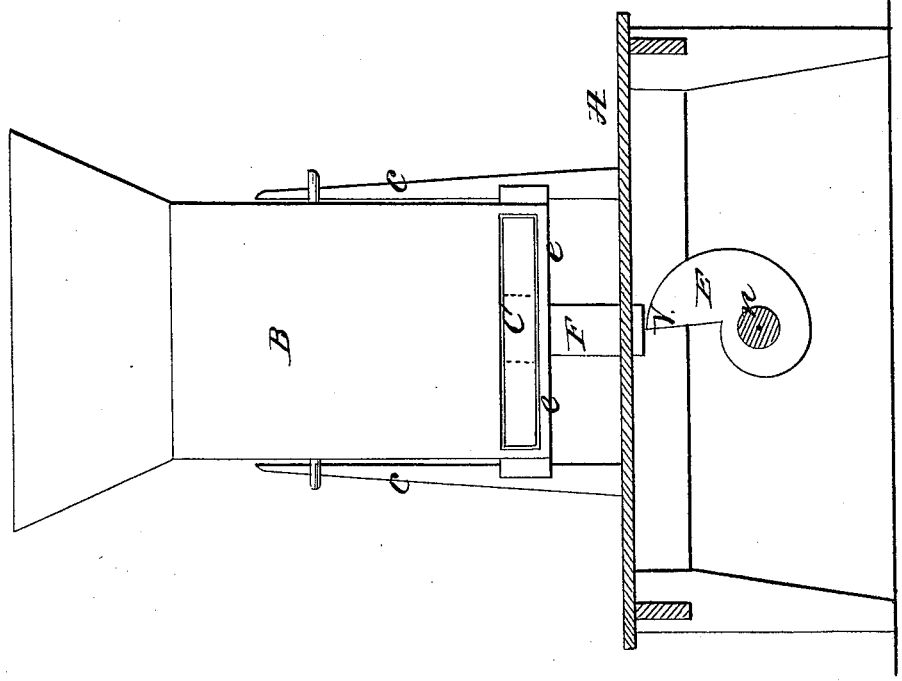

S. W. WOOD, OF WASHINGTON, DISTRICT OF COLUMBIA.

MANUFACTURE OF MACHINE-BRICKS.

Specification of Letters Patent No. 14,846, dated May 6, 1856.

*To all whom it may concern:*

Be it known that I, S. W. WOOD, of the city of Washington and District of Columbia, have invented a new and useful Mode of Molding Brick, of which the following is a full, clear, and exact description, reference being had to the accompanying drawings, making part of this specification.

Figure 1, represents a view in perspective showing one form of mechanism by which brick may be molded after my method. Fig. 2 is a side elevation, and Fig. 3 is a vertical section of the same.

Like letters indicate the same parts in all the figures.

The nature of my invention consists, in molding brick by concussion whether it be done by this or any other mechanism.

To enable others skilled in the art to mold brick after my improved method, I will proceed to a description of the same in detail, showing by the accompanying drawings one form of mechanism embracing my invention.

(A) in the accompanying drawings represents a table upon which is placed a hopper (B) to contain the prepared clay.

(c) are guides secured to the table (A) to retain the hopper (B) in a vertical position.

The lower end of the hopper (B) is perforated with an oblong opening corresponding in size, and in which the molds (C) are placed to receive the clay. In the accompanying drawings I have represented a series of but three compartments, but the number molded at once may be increased to meet the views of the different constructors. Secured to the hopper (B) and directly above the divisions (u) forming the molds, I have placed cross-bars (r) which are somewhat wider than these divisions (u) in order not only to divide the clay as it passes into the molds, but that the center of said molds may receive the clay first so that the air otherwise confined in the molds may escape by which means the edges and corners of the molds are completely filled, producing perfect brick.

Small holes may be made in the bottom (e) of the hopper for the escape of air if found necessary. Secured to the bottom (e) of the hopper (B) upon which the molds (C) rest, and passing through the table (A) is a lug or projection (F). Directly beneath this lug (F) and secured to a shaft (n) supported in bearings (a) attached to the table (A) is a cam (E) for the purpose of elevating the hopper (B) by operating against the end of the lug (F).

Figure 2 represents the hopper (B) at its highest position, and Figs. 1 and 3 represent the same at its lowest position or resting upon the table. The operation of this form of mechanism is as follows. The hopper (B) being filled with prepared clay (the molds (C) in position) is elevated as seen in Fig. 2 to any required height by rotating the cam (E). When the point (v) of this cam passes from beneath the lug (F), the hopper (B) drops upon the table forcing by the concussion the clay into the molds.

A cut-off may be arranged to separate the clay in the molds from that in the hopper, a description of which I do not deem necessary here.

Having thus fully described my improved mode of molding brick, what I claim therein as new and desire to secure by Letters Patent is—

Molding brick by concussion whether it be by this or any other mechanism.

S. W. WOOD.

Witnesses:
J. S. BROWN,
R. F. OSGOOD.